United States Patent
Kosuge et al.

(10) Patent No.: US 10,776,077 B2
(45) Date of Patent: Sep. 15, 2020

(54) METHOD, APPARATUS AND RECORDING MEDIUM FOR PROCESSING DIVISION CALCULATION

(71) Applicant: SAMSUNG ELECTRONICS CO., LTD., Suwon-si (KR)

(72) Inventors: Tetsuo Kosuge, Seoul (KR); Joon-ho Song, Hwaseong-si (KR); Chul-woo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 153 days.

(21) Appl. No.: 16/070,169

(22) PCT Filed: Jan. 20, 2016

(86) PCT No.: PCT/KR2016/000598
§ 371 (c)(1),
(2) Date: Jul. 13, 2018

(87) PCT Pub. No.: WO2017/126715
PCT Pub. Date: Jul. 27, 2017

(65) Prior Publication Data
US 2019/0018652 A1    Jan. 17, 2019

(51) Int. Cl.
*G06F 7/535*    (2006.01)
(52) U.S. Cl.
CPC .................... *G06F 7/535* (2013.01)
(58) Field of Classification Search
CPC ....... G06F 7/535–537; G06F 2207/5351–5356
See application file for complete search history.

(56) References Cited

U.S. PATENT DOCUMENTS

| | | | |
|---|---|---|---|
| 5,272,660 A | 12/1993 | Rossbach | |
| 5,828,591 A * | 10/1998 | Rotstain | G06F 7/535 708/654 |
| 6,510,493 B1 | 1/2003 | Liu et al. | |

(Continued)

FOREIGN PATENT DOCUMENTS

| | | |
|---|---|---|
| JP | 6-35675 A | 2/1994 |
| JP | 2001-43134 A | 2/2001 |

(Continued)

OTHER PUBLICATIONS

Communication dated Nov. 6, 2018, issued by the European Patent Office in counterpart European Application No. 16886558.2.

(Continued)

*Primary Examiner* — Matthew D Sandifer
(74) *Attorney, Agent, or Firm* — Sughrue Mion, PLLC

(57) ABSTRACT

Provided are a method and apparatus for processing a division operation. The method includes acquiring input data, detecting reference data related to a division operation corresponding to the acquired input data, from a cache memory in which data related to at least one division operation is pre-stored, selecting any one operator from among a plurality of operators identified according to at least one of a processable number of data bits and a calculation type, based on a difference between the detected reference data and the input data, and acquiring a result of performing division operation on the input data from the selected operator.

15 Claims, 14 Drawing Sheets

(56) References Cited

U.S. PATENT DOCUMENTS

| | | | |
|---|---|---|---|
| 6,832,294 B2 * | 12/2004 | Wicki | G06F 12/0893 |
| | | | 711/127 |
| 7,194,499 B2 | 3/2007 | Jeong | |
| 8,843,705 B2 | 9/2014 | Li et al. | |
| 2004/0249877 A1 | 12/2004 | Gerwig et al. | |
| 2006/0129624 A1 | 6/2006 | Abdallah et al. | |
| 2006/0294177 A1 | 12/2006 | Rubanovich | |
| 2010/0153645 A1 * | 6/2010 | Kim | G06F 12/0875 |
| | | | 711/118 |
| 2012/0173598 A1 | 7/2012 | Yang et al. | |
| 2014/0237189 A1 | 8/2014 | Glasco et al. | |
| 2016/0313976 A1 * | 10/2016 | Dibrino | G06F 7/52 |

FOREIGN PATENT DOCUMENTS

| | | |
|---|---|---|
| KR | 10-2004-0011916 A | 2/2004 |
| KR | 10-1102190 B1 | 1/2012 |
| KR | 10-1419615 B1 | 7/2014 |
| WO | 2013/044414 A1 | 4/2013 |

OTHER PUBLICATIONS

Eisig, D, et al., "The design of a 64-bit integer multiplier/divider unit", Jun. 29, 1993, Computer Arithmetic, p. 171-178, 7 pages total, XP010128516.

Oberman, S., et al., Division Algorithms and Implementations:, Aug. 1, 1997, IEEE Transactions on Computers, vol. 46, No. 8, p. 833-854, 22 pages total, XP000701411.

Written Opinion (PCT/ISA/237) dated Oct. 6, 2016 by the International Searching Authority in corresponding International Application No. PCT/KR2016/000598.

International Search Report (PCT/ISA/210) dated Oct. 6, 2016 by the International Searching Authority in corresponding International Application No. PCT/KR2016/000598.

\* cited by examiner

FIG. 11
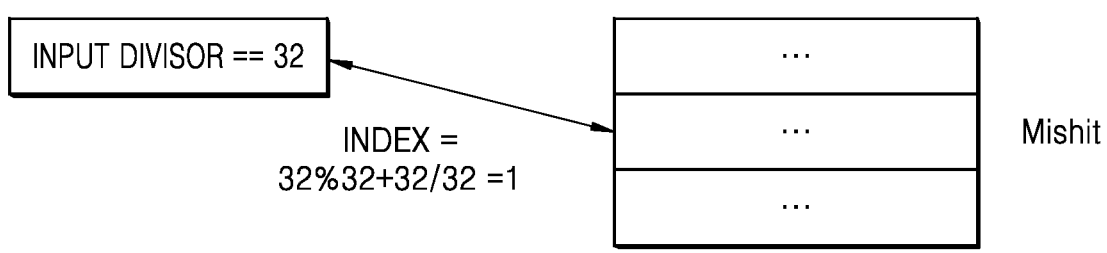
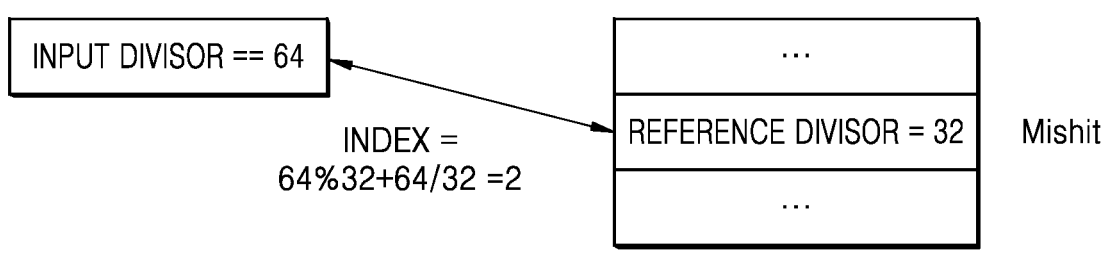
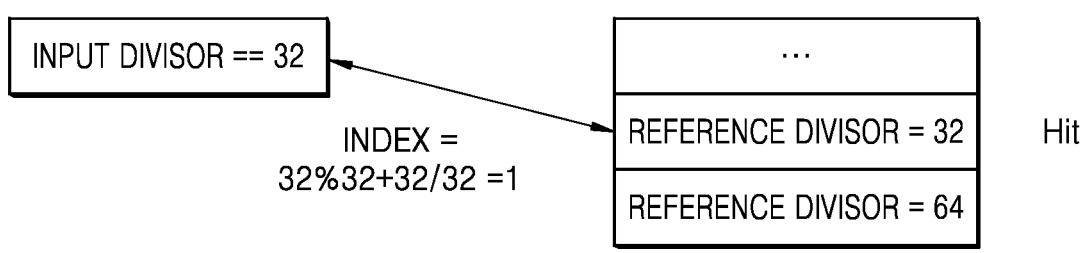

INPUT DIVIDEND = 0x10020
INPUT DIVISOR == 0x5(FIXED)

INDEX =
0x5%32*2+(0x10020≫16)
& 0x1 = 0x11

CACHE SIZE = 32word

Mishit

① t == 1

INPUT DIVIDEND = 0x10
INPUT DIVISOR == 0x5(FIXED)

INDEX =
0x5%32*2+(0x10≫16)
& 0x1 = 0x10

CACHE SIZE = 32word

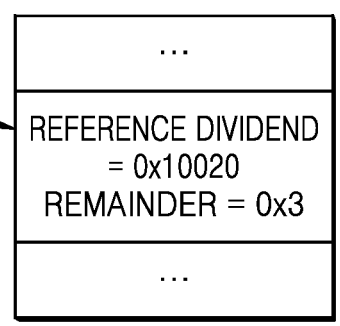

REFERENCE DIVIDEND = 0x10020
REMAINDER = 0x3

Mishit

① t == 2

INPUT DIVIDEND = 0x10020
INPUT DIVISOR == 0x5(FIXED)

INDEX =
0x5%32*2+(0x10020≫16)
& 0x1 = 0x11

CACHE SIZE = 32word

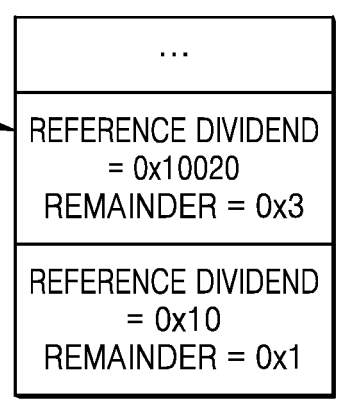

REFERENCE DIVIDEND = 0x10020
REMAINDER = 0x3

REFERENCE DIVIDEND = 0x10
REMAINDER = 0x1

Hit

METHOD, APPARATUS AND RECORDING MEDIUM FOR PROCESSING DIVISION CALCULATION

TECHNICAL FIELD

The present disclosure relates to a method of processing a division, an apparatus for processing a division operation, and a computer-readable recording medium having recording thereon a program, which when executed by a computer, performs the method of processing a division operation.

BACKGROUND ART

Along with the development of image processing technology and computer vision technology, application programs requiring complex operations have increased. In particular, the number of division operations to be processed by a central processing unit (CPU) and a graphics processing unit (GPU) is rapidly increasing. Since the resources used to perform division operation are greater than those for other operations, algorithms capable of efficiently performing division have been continuously developed.

However, currently developed algorithms need an additional lookup table or equipment to efficiently perform division operation, and most algorithms are adopted only to the structure of a specific division operation, and thus, development of a technique of efficiently performing division operation is still required.

DESCRIPTION OF EMBODIMENTS

Technical Problem

Provided are a method and an apparatus for processing a division operation, by which the division operation can be more efficiently processed by selecting an appropriate operator capable of performing division by using input data on which the division is to be performed and a previous division result, and a recording medium.

Solution to Problem

According to an aspect of the present disclosure, a method of processing a division operation includes: acquiring input data; detecting reference data related to a division operation corresponding to the acquired input data, from a cache memory in which data related to at least one division operation is pre-stored; selecting any one operator from among a plurality of operators identified according to at least one of a processable number of data bits and a calculation type, based on a difference between the detected reference data and the input data; and acquiring a result of performing the division on the input data from the selected operator.

Advantageous Effects of Disclosure

A division operation can be more efficiently processed by selecting an appropriate operator capable of performing the division by using a previous division result.

BRIEF DESCRIPTION OF DRAWINGS

FIG. 11 illustrates a method of determining an index when a difference between input divisors changed over time is a multiple of a size of a memory, according to an embodiment.

FIG. 12 illustrates a method of determining an index when an input divisor is fixed, and an input dividend is changed over time, according to an embodiment.

BEST MODE

Figure 1:
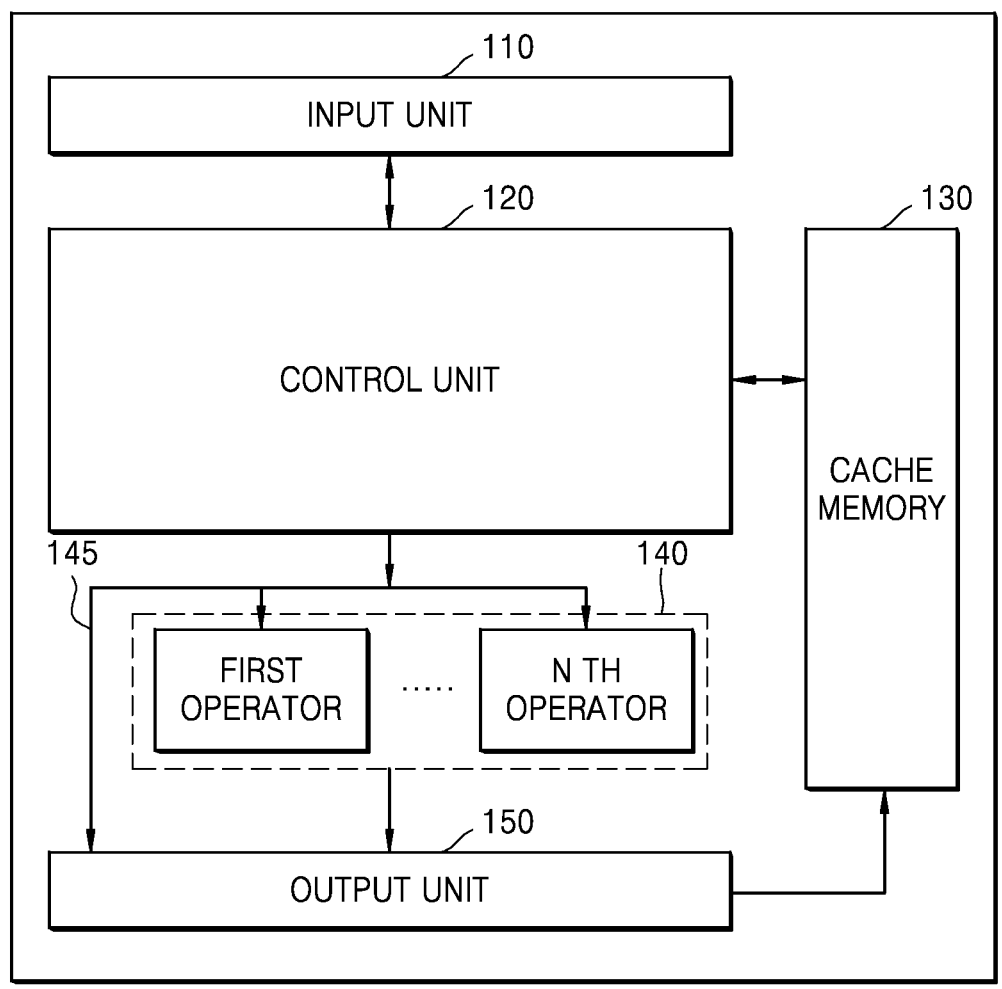
FIG. 1 is a block diagram of an apparatus for processing division operations, according to an embodiment.

According to an aspect of the present disclosure, a method of processing a division operation includes: acquiring input data; detecting reference data related to a division operation corresponding to the acquired input data, from a cache memory in which data related to at least one division operation is pre-stored; selecting any one operator from among a plurality of operators identified according to at least one of a processable number of data bits and a calculation type, based on a difference between the detected reference data and the input data; and acquiring a result of performing the division on the input data from the selected operator.

The method may further include determining whether the detected reference data is used, based on a difference between an input divisor included in the input data and a reference divisor included in the reference data.

The acquiring may include: calculating a difference value between an input dividend included in the input data and a reference dividend included in the reference data when the reference divisor is the same as the input divisor; when the calculated difference value is less than or equal to a preset threshold and the input divisor, comparing the reference dividend and the input dividend; and as a result of the comparison, when the reference dividend is greater than the input dividend, determining, as a quotient of the input data, a value obtained by subtracting 1 from a quotient included in the reference data, and when the reference dividend is less than or equal to the input dividend, determining the quotient of the reference data as the quotient of the input data.

The acquiring may include: calculating a difference value between an input dividend included in the input data and a reference dividend included in the reference data when the reference divisor is the same as the input divisor; when the calculated difference value is less than a preset threshold and is greater than the input divisor, calculating a quotient and a remainder obtained by dividing a difference between the input dividend and the reference dividend by the input divisor; and when the calculated quotient is greater than or equal to 0, or the calculated remainder is 0, determining a quotient of the input data as a value obtained by adding the calculated quotient to a quotient of the reference data, and when the calculated quotient is less than 0, and the calculated remainder is not 0, determining the quotient of the input data as a value obtained by subtracting 1 from the value obtained by adding the calculated quotient to the quotient of the reference data.

The acquiring may include performing division on an input dividend and the input divisor included in the input data when the reference divisor is different from the input divisor, or a difference value between the input dividend and a reference dividend is greater than a preset threshold.

The plurality of operators may include a first divider and a second divider of which processable numbers of data bits of a quotient of a division operation are different from each other, and the selecting may include selecting any one of the first divider and the second divider by comparing the processable number of data bits of a quotient of a division operation in the first divider and an input divisor included in the input data when the input divisor is different from a reference divisor included in the reference data.

The method may further include determining an index indicating a location in the cache memory based on at least one of an input divisor included in the acquired input data, an input dividend, and a size of the cache memory, wherein the detecting includes detecting the reference data from the cache memory by using the determined index.

The method may further include storing the division result at the location in the cache memory, which is indicated by the determined index.

According to another aspect of the present disclosure, an apparatus for processing a division operation includes: a cache memory in which data related to at least one division operation is pre-stored; an input unit configured to acquire input data; a calculation unit including a plurality of operators identified according to at least one of a processable number of data bits and a calculation type; a control unit configured to detect reference data related to a division operation corresponding to the acquired input data, from the cache memory and select any one of the plurality of operators based on a difference between the detected reference data and the input data; and an output unit configured to acquire a result of performing the division on the input data from the selected operator.

The control unit may be further configured to determine whether the detected reference data is used, based on a difference between an input divisor included in the input data and a reference divisor included in the reference data.

The calculation unit may be further configured to calculate a difference value between an input dividend included in the input data and a reference dividend included in the reference data when the reference divisor is the same as the input divisor, compare the reference dividend and the input dividend when the calculated difference value is less than or equal to a preset threshold and the input divisor, and as a result of the comparison, when the reference dividend is greater than the input dividend, determine, as a quotient of the input data, a value obtained by subtracting 1 from a quotient included in the reference data, and when the reference dividend is less than or equal to the input dividend, determine the quotient of the reference data as the quotient of the input data.

The calculation unit may be further configured to calculate a difference value between an input dividend included in the input data and a reference dividend included in the reference data when the reference divisor is the same as the input divisor, calculate a quotient and a remainder obtained by dividing a difference between the input dividend and the reference dividend by the input divisor when the calculated difference value is less than a preset threshold and is greater than the input divisor, determine a quotient of the input data as a value obtained by adding the calculated quotient to a quotient of the reference data when the calculated quotient is greater than or equal to 0, or the calculated remainder is 0, and determine the quotient of the input data as a value obtained by subtracting 1 from the value obtained by adding the calculated quotient to the quotient of the reference data when the calculated quotient is less than 0, and the calculated remainder is not 0.

The calculation unit may be further configured to perform division on an input dividend and the input divisor included in the input data when the reference divisor is different from the input divisor, or a difference value between the input dividend and a reference dividend is greater than a preset threshold.

The plurality of operators may include a first divider and a second divider of which processable numbers of data bits of a quotient of a division operation are different from each other, and the control unit may select any one of the first divider and the second divider by comparing a threshold, which is the processable number of data bits of a quotient of a division in the first divider, and an input divisor included in the input data when the input divisor is different from a reference divisor included in the reference data.

The control unit may be further configured to determine an index indicating a location in the cache memory based on at least one of an input divisor included in the acquired input data, an input dividend, and a size of the cache memory and detect the reference data from the cache memory by using the determined index.

The control unit may store the division result at the location in the cache memory, which is indicated by the determined index.

MODE OF DISCLOSURE

Hereinafter, embodiments of the present disclosure will be described in detail with reference to the accompanying drawings so that those of ordinary skill in the art may easily realize the present disclosure. However, the present disclosure may be embodied in many different forms and should not be construed as being limited to the embodiments set forth herein. In the drawings, parts irrelevant to the description are omitted to clearly describe the present disclosure, and like reference numerals denote like elements throughout the specification.

Throughout the specification, when it is described that a certain element is "connected" to another element, it should be understood that the certain element may be "directly connected" to another element or "electrically connected" via another element in the middle. In addition, when a component "includes" an element, unless there is another opposite description thereto, it should be understood that the component does not exclude another element but may further include another element.

Hereinafter, embodiments will be described in detail with reference to the accompanying drawings.

FIG. 1 is a block diagram of an apparatus 100 for processing a division operation, according to an embodiment.

The apparatus 100 for processing a division operation (herein after, division processing apparatus 100) shown in FIG. 1 includes only components related to the present embodiment. Therefore, it should be understood by those of ordinary skill in the art that other general-use components besides the components shown in FIG. 1 may be further included.

Referring to FIG. 1, the division processing apparatus 100 may include an input unit 110, a control unit 120, a cache memory 130, a plurality of operators 140, and an output unit 150.

The input unit 110 acquires input data. According to an embodiment, the input unit 110 may acquire input data on which division is to be performed from an external device connected to the division processing apparatus 100. Herein, the external device may include at least one of a memory (not shown), another operator (not shown) that performs another operation other than division, and a processor.

According to an embodiment, the input unit 110 may include a plurality of slots so as to enable a division operation on a plurality of pieces of input data in a parallel manner. Input data may be allocated to each of the plurality of slots constituting the input unit 110. For example, when division is performed in a parallel manner according to a single instruction multiple data (SIMD) structure, the input unit 110 may include a plurality of slots.

However, this is only illustrative, and the input unit 110 may not include a plurality of slots.

The control unit 120 detects reference data related to a division operation corresponding to the acquired input data, from data related to a previous division operation, which is stored in the cache memory 130. The input data may include an input dividend and an input divisor. In addition, the reference data may include a reference dividend, a reference divisor, and at least one of a quotient and a remainder which are processing results of a division operation on the reference dividend and the reference divisor.

When no data related to a previous division operation is stored in the cache memory 130, the control unit 120 may perform division on the input data by using the plurality of operators 140 without detecting the reference data. Herein, information regarding a result of the performed division and the input data may be stored in the cache memory 130.

According to an embodiment, the control unit 120 may determine an index indicating a location in the cache memory 130, from which the reference data is to be detected, based on at least one of the input dividend, the input divisor, and a size of the cache memory 130.

For example, the control unit 120 may determine, as the index, a modulo operation result value between the input divisor and the size of the cache memory 130. As another example, the control unit 120 may determine index information by adding a division result between the input divisor and the size of the cache memory 130 to a modulo operation result between the input divisor and the size of the cache memory 130. As another example, the control unit 120 may determine the index information by adding partial data bits constituting the input dividend to the modulo operation result between the input divisor and the size of the cache memory 130. The control unit 120 may detect the reference data from the cache memory 130 by using the determined index.

According to an embodiment, the control unit 120 may compare the reference divisor and the reference dividend included in the reference data with the input divisor and the input dividend included in the input data, respectively. When a difference between the detected reference data and the input data is less than a preset value, the control unit 120 may determine a result of performing division on the reference data as a result of performing division on the input data. For example, both a difference between the reference divisor and the input divisor and a difference between the reference dividend and the input dividend are less than the preset value, the control unit 120 may pass the result of performing the division on the reference data, through a circuit 145 connected to the output unit 150.

When the difference between the detected reference data and the input data is greater than or equal to the preset value, the control unit 120 selects any one of the plurality of operators 140 capable of processing a division operation on the input data, based on the difference between the detected reference data and the input data.

Herein, the plurality of operators 140 may be identified according to at least one of a processable number of data bits and a calculation type. For example, the plurality of operators 140 may include at least one subtracter and a plurality of dividers. In addition, the plurality of dividers may be classified according to processable numbers of data bits. Herein, the processable number of data bits may be the maximum calculable number of data bits of a quotient of a division result. For example, the plurality of operators may include a first divider and a second divider of which the maximum calculable numbers of data bits of a quotient of a division result are different from each other. The first divider and the second divider will be described in more detail below with reference to FIGS. 2A and 2B.

According to an embodiment, the control unit 120 may select any one of the plurality of operators based on the difference between the input dividend and the reference dividend. For example, the control unit 120 may calculate a first value obtained by subtracting a remainder included in the reference data from the reference dividend, and select any one of the plurality of operators based on a result of comparing a second value, which is a difference value between the calculated first value and the input dividend, with the input divisor. The control unit 120 may select the subtracter when the second value is less than or equal to the input divisor, and select any one of the first divider and the second divider when the second value is greater than the input divisor.

Alternatively, the control unit 120 may select any one of the first divider and the second divider based on at least one of whether the calculated second value is less than the maximum calculable number of data bits of a quotient in the first divider (hereinafter, threshold) and whether the input divisor is less than the threshold. It is assumed that the number of data bits processable in the first divider is less than the number of data bits processable in the second divider.

The control unit 120 may determine a condition for selecting any one of the plurality of operators by determining whether the input divisor is the same as the reference divisor.

For example, when the input divisor is the same as the reference divisor, the control unit 120 may first compare the calculated second value and the input divisor. When the second value is less than or equal to the input divisor, the control unit 120 may select the subtracter. When the second value is greater than the input divisor and is less than the threshold, the control unit 120 may select the first divider. When the second value is greater than the input divisor and is greater than or equal to the threshold, the control unit 120 may select any one of the first divider and the second divider by comparing the input divisor and the threshold. In detail, when the second value is greater than the input divisor and is greater than or equal to the threshold, and the input divisor is greater than the threshold, the control unit 120 may select the first divider. In addition, when the second value is greater than the input divisor and is greater than or equal to the threshold, and the input divisor is less than or equal to the threshold, the control unit 120 may select the second divider.

As another example, when the input divisor is different from the reference divisor, the control unit 120 may select any one of the plurality of operators by comparing the input divisor and the threshold. The control unit 120 may select the first divider when the input divisor is greater than the threshold, and select the second divider when input divisor is less than or equal to the threshold.

The cache memory 130 pre-stores data related to at least one division performed prior to the division on the input data. In addition, the result of performing the division on the input data may be stored at the location indicated by the determined index in the cache memory 130.

The plurality of operators 140 include n operators capable of performing division on the input data. For example, the plurality of operators 140 may include at least one subtracter, at least one first divider, and at least one second divider.

The output unit 150 acquires the result of performing the division on the input data from the selected operator. According to an embodiment, the output unit 150 may include a plurality of slots so as to acquire a result of a division performed in a parallel manner for a plurality of pieces of input data, respectively. A result of a division on each of the plurality of pieces of input data may be allocated to each of the plurality of slots constituting the output unit 150.

However, this is only illustrative, and the output unit 150 may not include the plurality of slots.

Figure 2A:
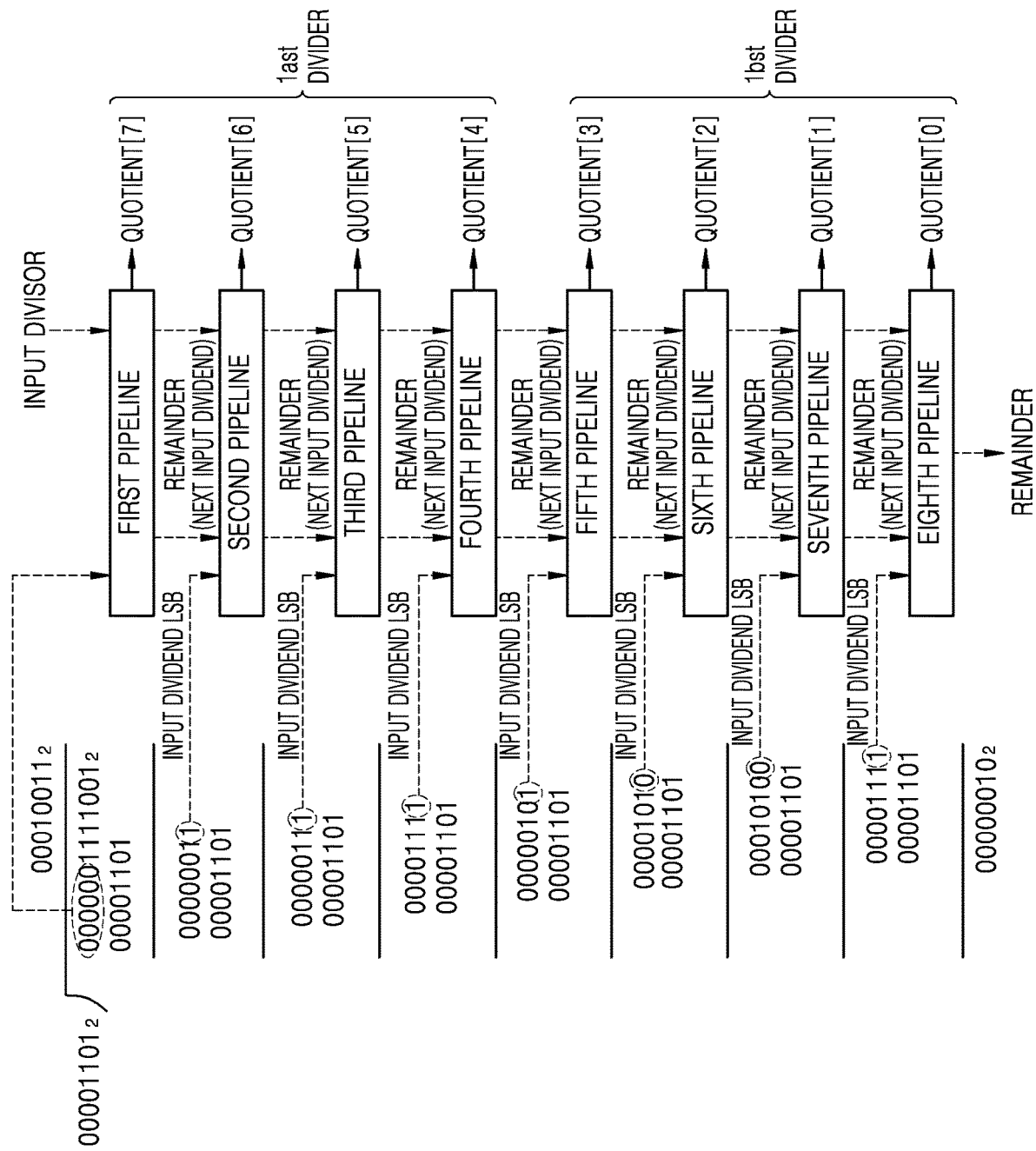
FIGS. 2A and 2B illustrate a criterion of selecting a divider when division is performed on input data, according to an embodiment.
Figure 2B:
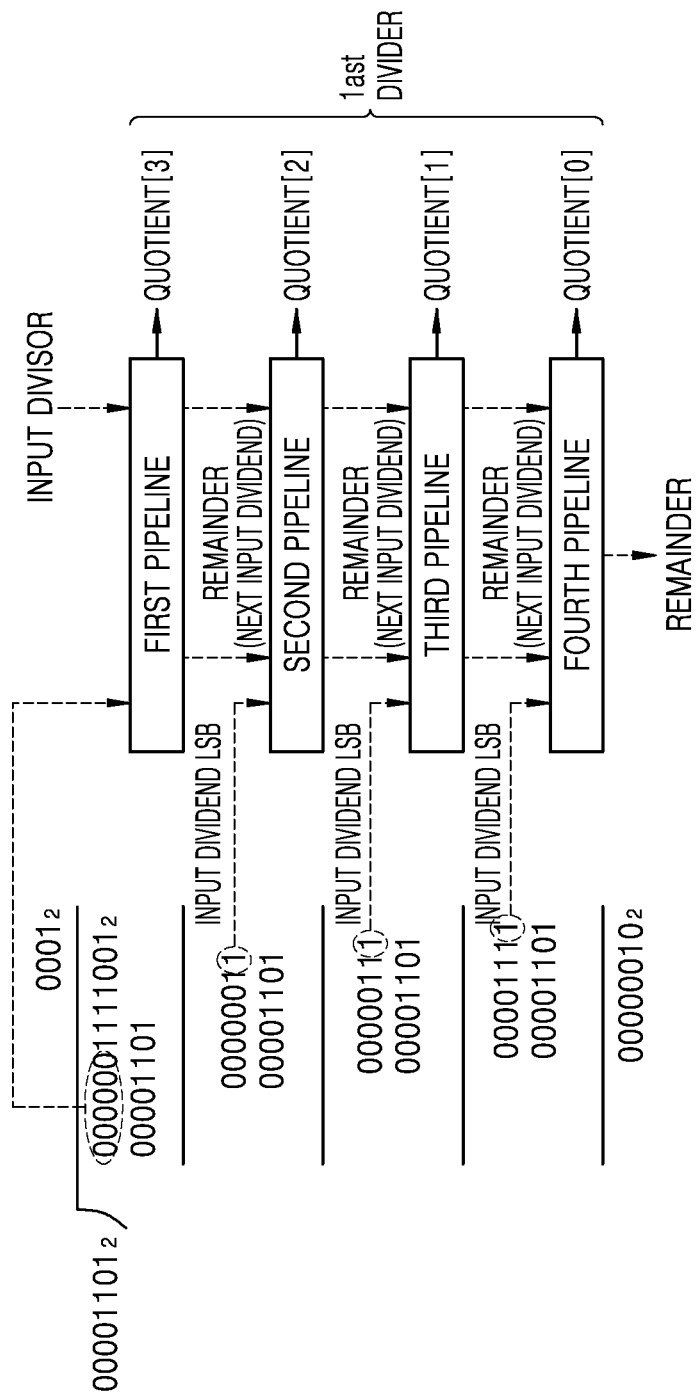

FIGS. 2A and 2B illustrate a criterion of selecting a divider when division is performed on input data, according to an embodiment.

Referring to FIG. 2A, a process by which the division processing apparatus 100 performs division by transforming each of 249 and 13 to a binary number is shown. Herein, it is assumed that a first divider may calculate a quotient of a division result up to four bits. Accordingly, the threshold may be determined as 4.

When division is performed by transforming each of 249 and 13 to a binary number, a quotient includes eight bits, and thus the division cannot be performed using the first divider. In this case, the division processing apparatus 100 may select a second divider capable of calculating a quotient, which is a division result, up to eight bits. However, this is only illustrative, and the maximum number of bits of a quotient which the second divider can calculate is not limited to eight bits. Herein, the second divider may include a plurality of first dividers.

Referring to FIG. 2B, a process by which the division processing apparatus 100 performs division by transforming each of 15 and 13 to a binary number is shown. When division is performed by transforming each of 15 and 13 to a binary number, a quotient has four bits, and thus the division may be performed using the first divider.

If the division processing apparatus 100 performs division processing on input data by using the second divider, a more resource may be consumed than when the division processing on the input data is performed by using the first divider.

According to an embodiment, the division processing apparatus 100 may efficiently use a resource required for calculation, by selecting an operator capable of performing division on input data, based on a difference between the input data and reference data.

Figure 3:
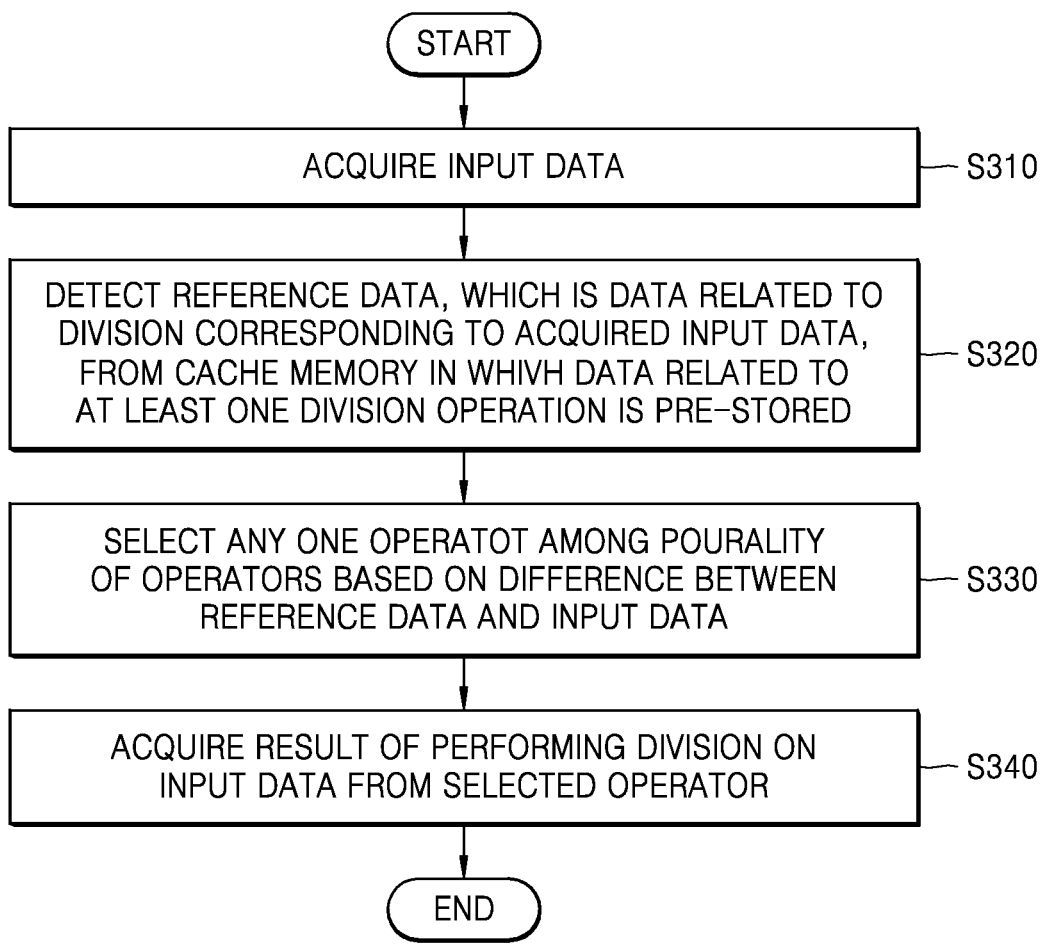
FIG. 3 is a flowchart for describing a division processing method, according to an embodiment.

FIG. 3 is a flowchart for describing a division processing method, according to an embodiment.

In operation S310, the division processing apparatus 100 acquires input data.

According to an embodiment, the division processing apparatus 100 may acquire input data on which division is to be performed from an external device connected to the division processing apparatus 100.

In operation S320, the division processing apparatus 100 detects reference data related to a division operation corresponding to the acquired input data, from a cache memory in which data related to at least one division operation is pre-stored.

According to an embodiment, the division processing apparatus 100 may determine an index indicating a location in the cache memory to detect the reference data, based on at least one of an input divisor, an input dividend, and a size of the cache memory. In addition, the division processing apparatus 100 may detect the reference data from the cache memory by using the determined index.

In operation S330, the division processing apparatus 100 selects any one operator from among a plurality of operators identified according to at least one of the processable number of data bits and a calculation type, based on a difference between the detected reference data and the input data.

A detailed method by which the division processing apparatus 100 selects an operator based on a difference between reference data and input data, according to an embodiment, will be described in detail below with reference to FIG. 4.

In operation S340, the division processing apparatus 100 acquires a result of performing division on the input data from the selected operator.

According to an embodiment, the division processing apparatus 100 may store the acquired division result at a location in the cache memory, which is indicated by an index determined based on the input data.

Figure 4:
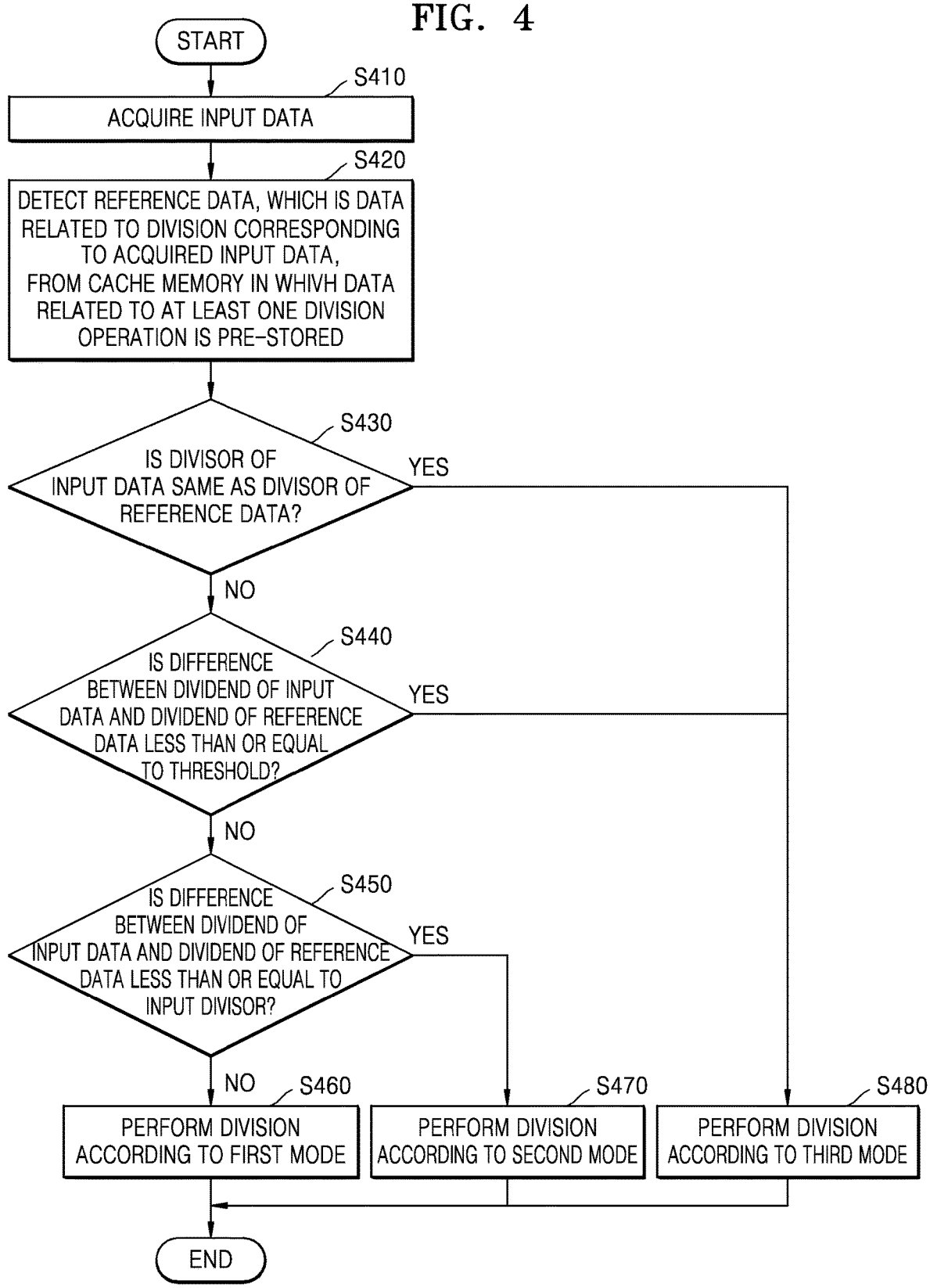
FIG. 4 is a flowchart for describing in more detail a division processing method according to an embodiment.

FIG. 4 is a flowchart for describing in more detail a division processing method according to an embodiment.

In operation S410, the division processing apparatus 100 may acquire input data. Operation S410 may correspond to operation S310 described above with reference to FIG. 3.

In operation S420, the division processing apparatus 100 may detect reference data related to a division operation corresponding to the acquired input data, from a cache memory in which data related to at least one division operation is pre-stored.

Operation S420 may correspond to operation S320 described above with reference to FIG. 3.

In operation S430, the division processing apparatus 100 may determine whether a divisor of the input data is the same as a divisor of the reference data.

In operation S440, the division processing apparatus 100 may determine whether a difference between a dividend of the input data and a dividend of the reference data is less than or equal to the threshold.

According to an embodiment, the division processing apparatus 100 may determine whether the difference between the dividend of the input data and the dividend of the reference data is less than or equal to the threshold when the divisor of the input data is the same as the divisor of the reference data.

In operation S450, the division processing apparatus 100 may determine whether the difference between the dividend of the input data and the dividend of the reference data is less than or equal to the input divisor.

According to an embodiment, the division processing apparatus 100 may determine whether the difference between the dividend of the input data and the dividend of the reference data is less than or equal to the input divisor when the difference between the dividend of the input data and the dividend of the reference data is less than or equal to the threshold.

In operation S460, the division processing apparatus 100 may perform division on the input data according to a first mode.

According to an embodiment, the division processing apparatus 100 may perform division on the input data according to the first mode when the difference between the dividend of the input data and the dividend of the reference data is less than or equal to the input divisor. The division processing apparatus 100 may acquire a result of performing the division on the input data from the reference data by using a subtracter or an adder without using a divider in the first mode. This will be described in more detail below with reference to FIG. 5.

In operation S470, the division processing apparatus 100 may perform division on the input data according to a second mode.

According to an embodiment, the division processing apparatus 100 may perform division on the input data according to the second mode when the difference between the dividend of the input data and the dividend of the reference data is greater than the input divisor. The division processing apparatus 100 may acquire a result of performing the division on the input data by performing division based on the detected reference data in the second mode. This will be described in more detail below with reference to FIGS. 6A and 6B.

In operation S480, the division processing apparatus 100 may perform division on the input data according to a third mode.

According to an embodiment, the division processing apparatus 100 may perform division on the input data according to the third mode when the divisor of the input data is different from the divisor of the reference data. According to another embodiment, the division processing apparatus 100 may also perform division on the input data according to the third mode when the difference between the dividend of the input data and the dividend of the reference data is less than or equal to the threshold. The division processing apparatus 100 may directly perform division on the input data without using the reference data. This will be described in more detail below with reference to FIG. 7.

Figure 5:
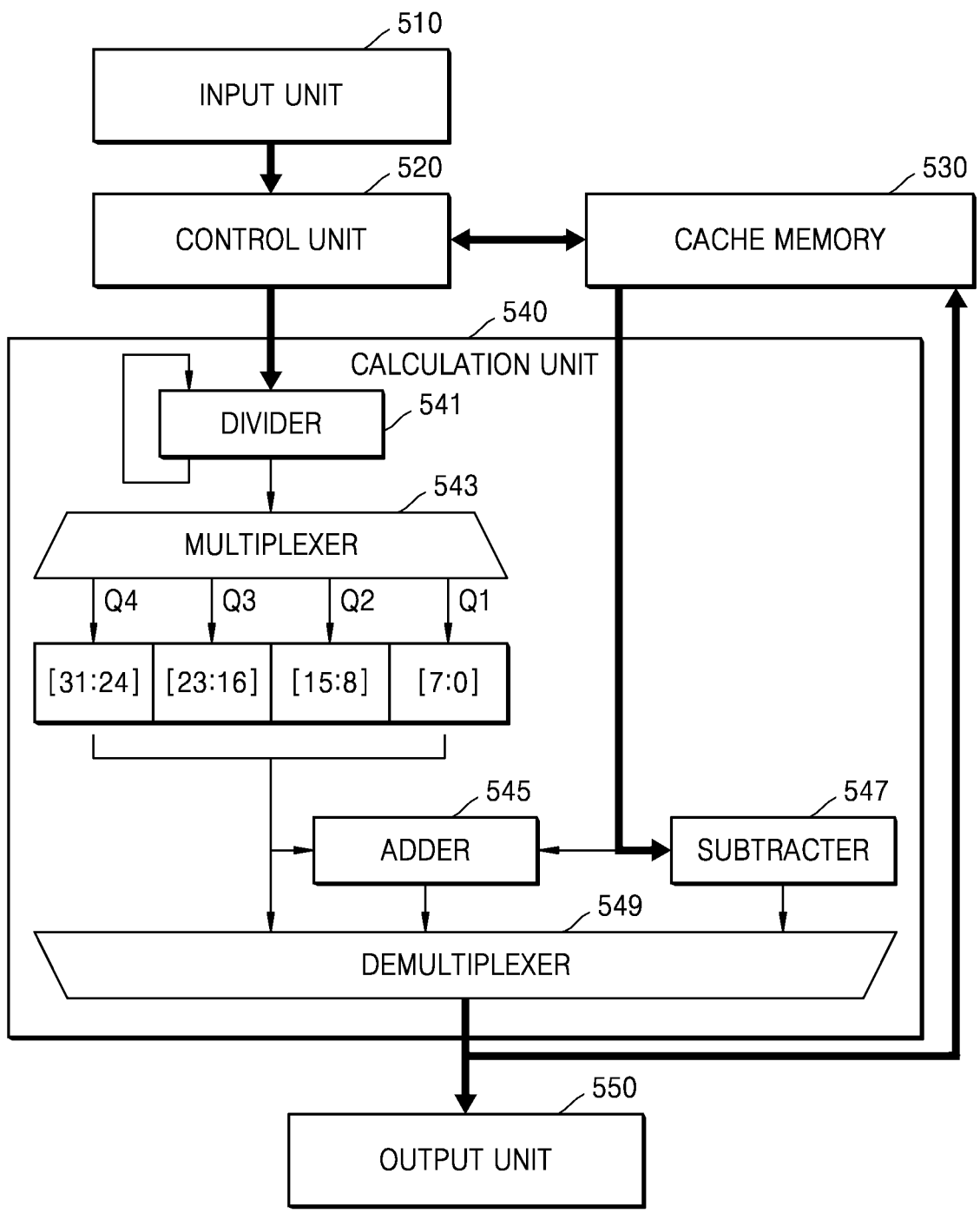
FIG. 5 is a block diagram for describing a method by which a division processing apparatus performs division according to a first mode, according to an embodiment.

FIG. 5 is a block diagram for describing a method by which a division processing apparatus performs division according to the first mode, according to an embodiment.

A division processing apparatus 500 shown in FIG. 5 includes only components related to the present embodiment. Therefore, it should be understood by those of ordinary skill in the art that other general-use components besides the components shown in FIG. 5 may be further included.

Referring to FIG. 5, the division processing apparatus 500 may include an input unit 510, a control unit 520, a cache memory 530, a calculation unit 540, and an output unit 550.

In addition, the calculation unit 540 may include a divider 541, a multiplexer 543, an adder 545, a subtracter 547, and a demultiplexer 549.

According to an embodiment, the input unit 510 may acquire input data. For example, the input unit 510 may acquire input data of which a dividend is 490 and a divisor is 33. The control unit 520 may determine an index of the acquired input data as 1 by performing a modulo operation on the divisor, 33, by using 32 which is a size of the cache memory 530. Accordingly, the control unit 520 may detect reference data corresponding to the index, 1, from the cache memory 530. Herein, it is assumed that a dividend of the detected reference data is 495, and a divisor thereof is 33.

Since the divisor of the input data is the same as the divisor of the reference data, the calculation unit 540 may determine whether a difference between 490, which is the dividend of the input data, and 495, which is the dividend of the reference data, (hereinafter, difference value) is less than or equal to a threshold, 0xffff. The calculation unit 540 may compare the difference value with the divisor of the input data since it is determined that the difference value is less than or equal to the threshold, 0xffff. The control unit 520 may select the first mode among the plurality of modes since 5, which is the difference value calculated by the calculation unit 540, is less than 33 which is the divisor of the input data.

Since the first mode is selected by the control unit 520, the calculation unit 540 may compare the reference dividend with the input dividend. As a result of the comparison, when the reference dividend is greater than the input dividend, the calculation unit 540 may determine, as a quotient of the input data, a value obtained by subtracting 1 from a quotient included in the reference data. According to another example, when the reference dividend is less than or equal to the input dividend, the calculation unit 540 may determine the quotient of the reference data as the quotient of the input data. For example, since 490, which is the dividend of the input data, is less than 495, which is the dividend of the reference data, the calculation unit 540 may perform a subtraction for subtracting 1 from 15, which is the quotient of the reference data, through the subtracter 547. A calculation result may be delivered to the output unit 550 through the demultiplexer 549.

The output unit 550 may receive and output the calculation result of the calculation unit 540. Herein, the calculation unit 540 may transmit the calculation result to the cache memory 530 such that the calculation result is updated in the cache memory 530.

According to the above-described method, the division processing apparatus 500 according to an embodiment may perform division on input data without using the divider 541 in the first mode.

Figure 6A:
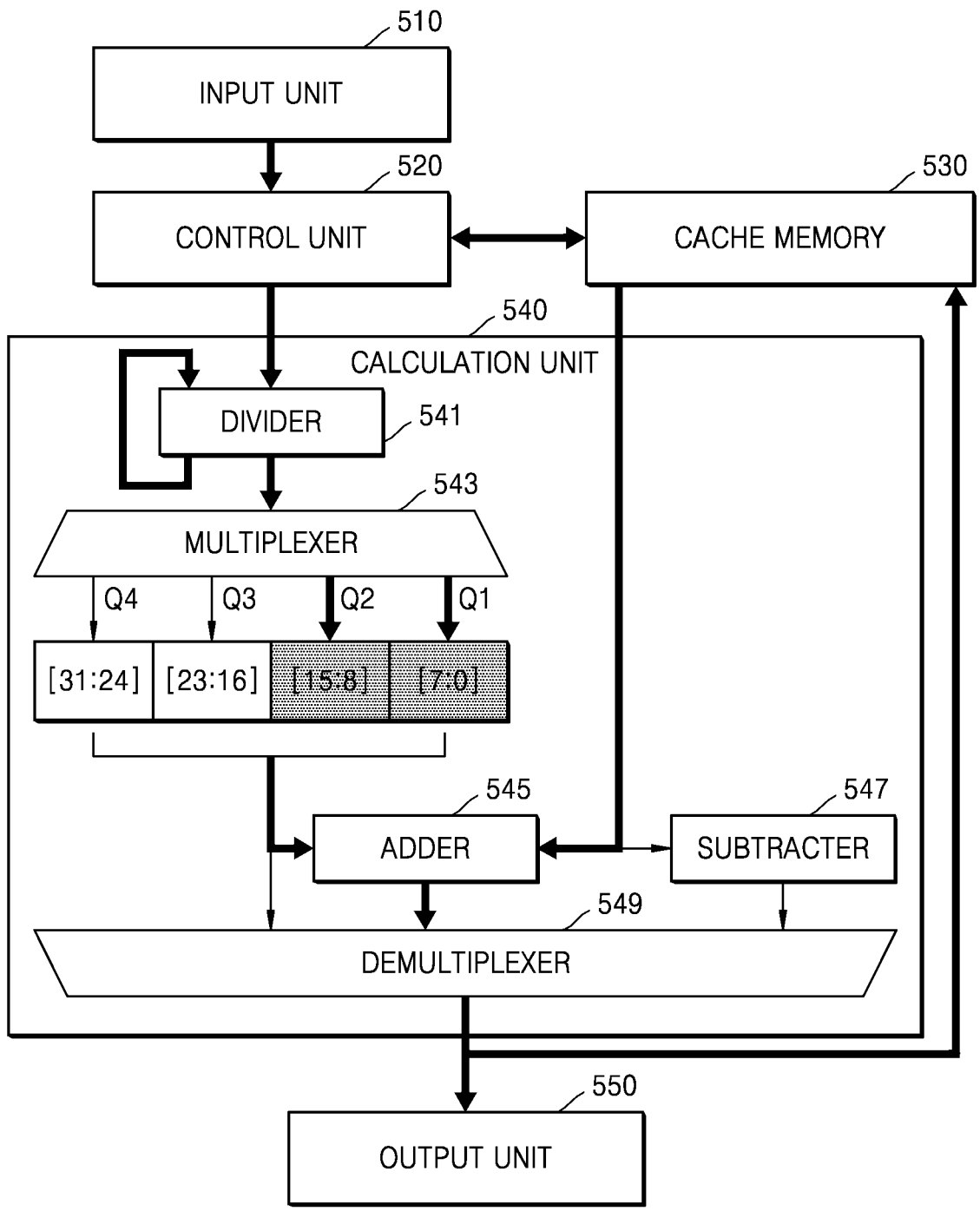
FIGS. 6A and 6B are block diagrams for describing a method by which a division processing apparatus performs division according to a second mode, according to an embodiment.
Figure 6B:
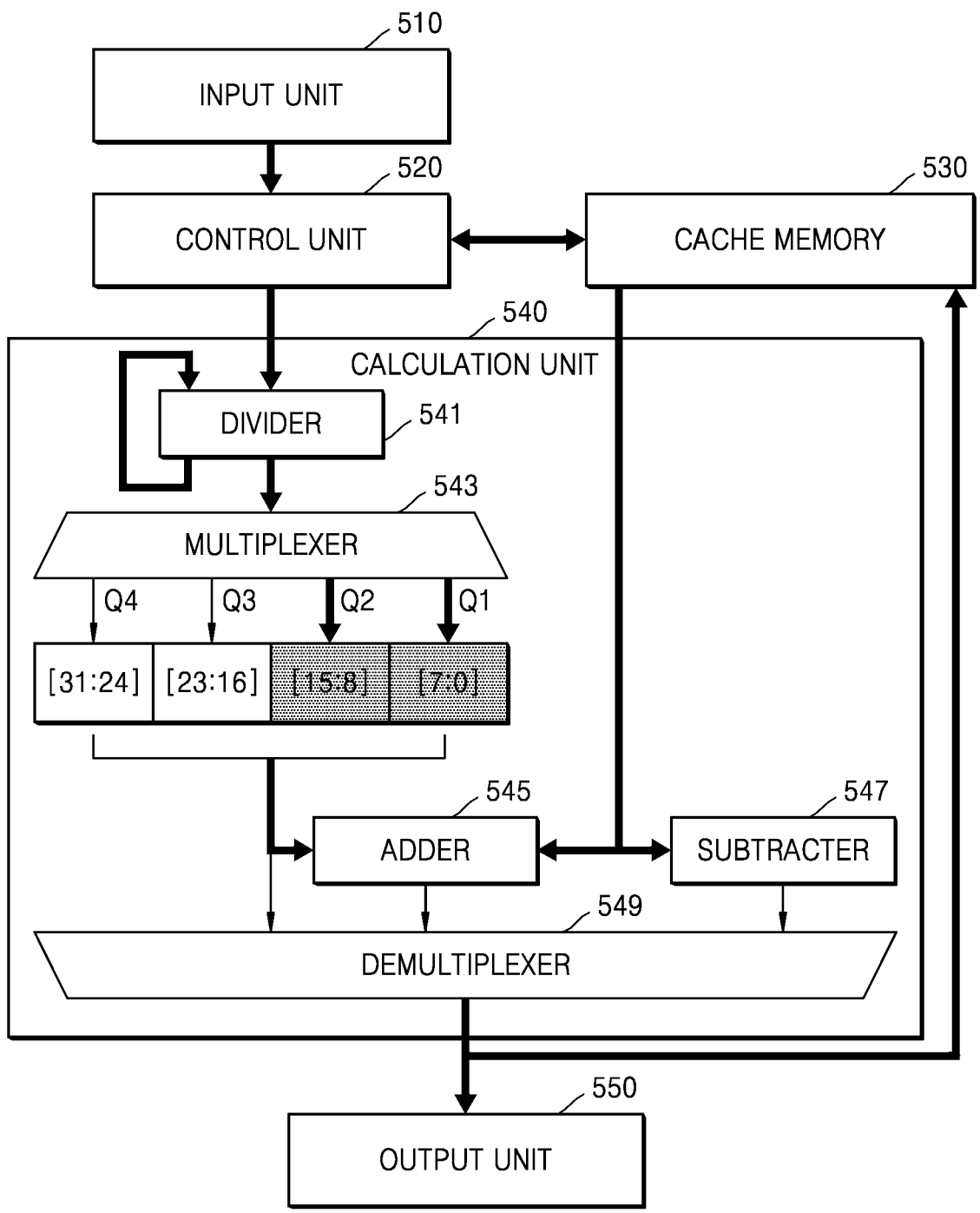

FIGS. 6A and 6B are block diagrams for describing a method by which a division processing apparatus performs division according to the second mode, according to an embodiment.

Herein a division processing apparatus 500 shown in FIGS. 6A and 6B may correspond to the division processing apparatus 500 described above with reference to FIG. 5.

Referring to FIG. 6A, according to an embodiment, the input unit 510 may acquire input data of which a dividend is 545 and a divisor is 33. The control unit 520 may determine an index of the acquired input data as 1 by performing a modulo operation on the divisor, 33, by using 32 which is the size of the cache memory 530. Accordingly, the control unit 520 may detect reference data corresponding to the index, 1, from the cache memory 530. Herein, it is assumed that a dividend of the detected reference data is 495, and a divisor thereof is 33.

Since the divisor of the input data is the same as the divisor of the reference data, the calculation unit 540 may determine whether a difference between 545, which is the dividend of the input data, and 495, which is the dividend of the reference data, (hereinafter, difference value) is less than or equal to the threshold, 0xffff. The calculation unit 540 may compare the difference value with the divisor of the input data since it is determined that the difference value is less than or equal to the threshold, 0xffff. The control unit 520 may select the second mode among the plurality of modes since 50, which is the difference value calculated by the calculation unit 540, is greater than 33 which is the divisor of the input data.

Since the second mode is selected by the control unit 520, the calculation unit 540 may calculate a quotient and a remainder obtained by dividing a difference between the input dividend and the reference dividend by the input divisor. The calculation unit 540 may determine a quotient of the input data as a value obtained by adding the calculated quotient to a quotient of the reference data when the calculated quotient is greater than or equal to 0, or the calculated remainder is 0. According to another example, the calculation unit 540 may determine the quotient of the input data as a value obtained by subtracting 1 from the value obtained by adding the calculated quotient to the quotient of the reference data when the calculated quotient is less than 0, and the calculated remainder is not 0.

For example, the divider 541 included in the calculation unit 540 may calculate a quotient, 1, and a remainder, 17, by dividing the reference value, 50, by the divisor, 33. In addition, the adder 545 included in the calculation unit 540 may determine the quotient of the input data as 16 by adding the calculated quotient, 1, to 15 which is the quotient of the reference data. A calculation result may be delivered to the output unit 550 through the demultiplexer 549.

The output unit 550 may receive and output the calculation result of the calculation unit 540. Herein, the calculation unit 540 may transmit the calculation result to the cache memory 530 such that the calculation result is updated in the cache memory 530.

Referring to FIG. 6B, according to an embodiment, the input unit 510 may acquire input data of which a dividend is 320 and a divisor is 33. The control unit 520 may determine an index of the acquired input data as 1 by performing a modulo operation on the divisor, 33, by using 32 which is the size of the cache memory 530. Accordingly, the control unit 520 may detect reference data corresponding to the index, 1, from the cache memory 530. Herein, it is assumed that a dividend of the detected reference data is 495, and a divisor thereof is 33.

Since the divisor of the input data is the same as the divisor of the reference data, the calculation unit 540 may determine whether a difference between 320, which is the dividend of the input data, and 495, which is the dividend of the reference data, (hereinafter, difference value) is less than or equal to the threshold, 0xffff. The calculation unit 540 may compare the difference value with the divisor of the input data since it is determined that the difference value is less than or equal to the threshold, 0xffff. The control unit 520 may select the second mode among the plurality of modes since 175, which is the difference value calculated by the calculation unit 540, is greater than 33 which is the divisor of the input data.

Since the second mode is selected by the control unit 520, the calculation unit 540 may calculate a quotient of the input data by performing a division based on the reference data. For example, the divider 541 included in the calculation unit 540 may calculate a quotient, −5, and a remainder, −10, by dividing the difference value, −175, by the divisor, 33. The adder 545 included in the calculation unit 540 may add 15, which is a quotient of the reference data, to the calculated quotient, −5. When a value obtained by dividing the difference value by the divisor is less than 0 and a remainder thereof is not 0, the subtracter 547 included in the calculation unit 540 may perform a subtraction of subtracting 1 from an addition result of the adder 545. Accordingly, the calculation unit 540 may determine the quotient, which is calculated as a result of performing division on the input data, as 9. A calculation result may be delivered to the output unit 550 through the demultiplexer 549.

The output unit 550 may receive and output the calculation result of the calculation unit 540. Herein, the calculation unit 540 may transmit the calculation result to the cache memory 530 such that the calculation result is updated in the cache memory 530.

Figure 7:
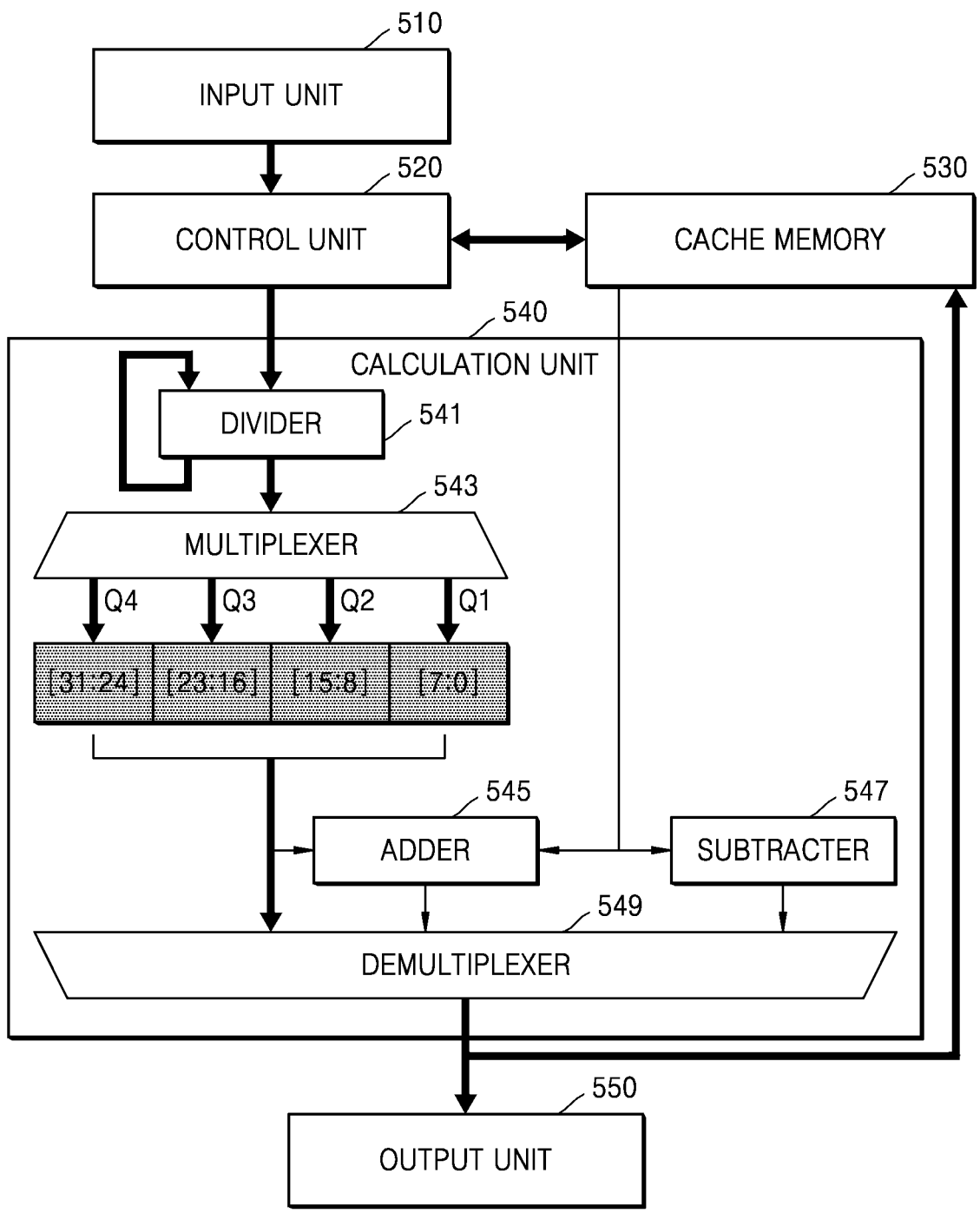
FIG. 7 is a block diagram for describing a method by which a division processing apparatus performs division according to a third mode, according to an embodiment.

FIG. 7 is a block diagram for describing a method by which a division processing apparatus 500 performs division according to the third mode, according to an embodiment.

Herein the division processing apparatus 500 shown in FIG. 7 may correspond to the division processing apparatus 500 described above with reference to FIG. 5.

According to an embodiment, the input unit 510 may acquire input data. For example, the input unit 510 may acquire input data of which a dividend is 131072 and a divisor is 33. The control unit 520 may determine an index of the acquired input data as 1 by performing a modulo operation on the divisor, 33, by using 32 which is the size of the cache memory 530. Accordingly, the control unit 520 may detect reference data corresponding to the index, 1, from the cache memory 530. Herein, it is assumed that a dividend of the detected reference data is 495, and a divisor thereof is 33.

Since the divisor of the input data is the same as the divisor of the reference data, The calculation unit 540 may determine whether a difference between 131072, which is the dividend of the input data, and 495, which is the dividend of the reference data, (hereinafter, difference value) is less than or equal to the threshold, 0xffff. The control unit 520 may select the third mode since the difference value is greater than the threshold, 0xffff.

Since the third mode is selected by the control unit 520, the calculation unit 540 may perform division on the input data by using the divider 541. As a result obtained by performing the division on the input data in the divider 541, a quotient of the input data may be determined as 3971. A calculation result may be delivered to the output unit 550 through the demultiplexer 549.

The output unit 550 may receive and output the calculation result of the calculation unit 540. Herein, the calculation unit 540 may transmit the calculation result to the cache memory 530 such that the calculation result is updated in the cache memory 530.

Figure 8:
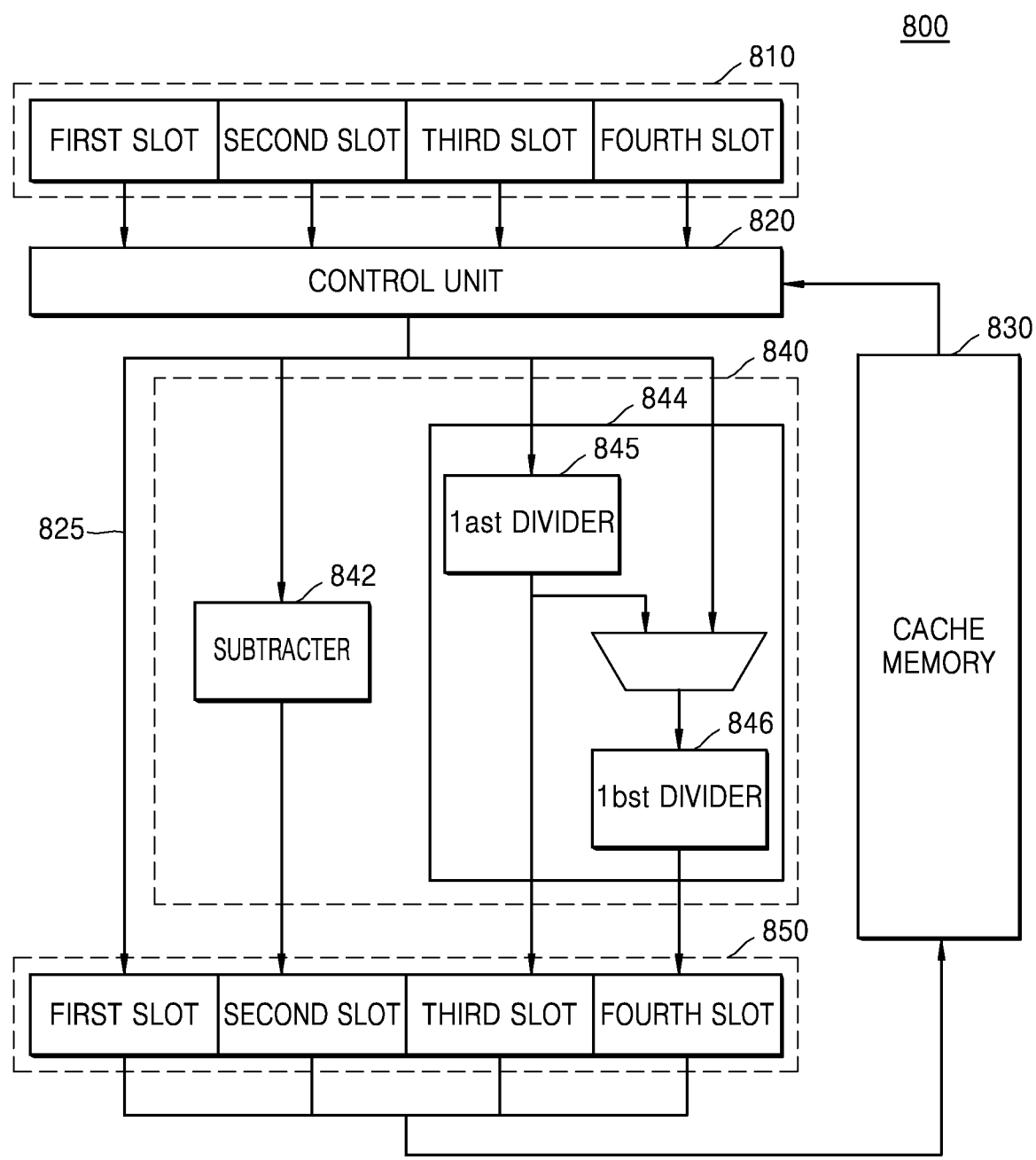
FIG. 8 is a block diagram for describing in more detail a division processing apparatus according to another embodiment.

FIG. 8 is a block diagram for describing in more detail a division processing apparatus 800 according to another embodiment.

The division processing apparatus 800 shown in FIG. 8 includes only components related to the present embodiment. Therefore, it should be understood by those of ordinary skill in the art that other general-use components besides the components shown in FIG. 8 may be further included.

Referring to FIG. 8, the division processing apparatus 800 may include an input unit 810, a control unit 820, a cache memory 830, a plurality of operators 840, and an output unit 850.

According to an embodiment, the input unit 810 may acquire input data on which division is to be performed. The input unit 810 may include a plurality of slots to perform division on a plurality of pieces of input data in a parallel manner.

According to an embodiment, the control unit 820 may detect reference data related to a division operation corresponding to the acquired input data, from the cache memory 830. When a difference between the input data and the reference data is less than a preset value, the control unit 820 may determine a result of performing division on the reference data as a result of performing division on the input data, through a circuit 825 connected to the output unit 850. When the difference between the input data and the reference data is greater than or equal to the preset value, the control unit 820 may select any one of the plurality of operators 840 based on the difference between the detected reference data and the input data.

According to an embodiment, the cache memory 830 may store data related to at least one division result performed by the division processing apparatus 800. For example, the cache memory 830 may store data related to another division result performed prior to division on the input data.

According to an embodiment, the plurality of operators 840 may include a subtracter 842 and a plurality of first dividers 845 and 846. Herein, the plurality of first dividers 845 and 846 may be connected to each other to operate as a second divider 844. For example, when the control unit 820 selects a first divider, any one of a $1a^{st}$ divider 845 and a $1b^{st}$ divider 846 may be selected. When the control unit 820 selects the second divider 844, the $1a^{st}$ divider 845 and the $1b^{st}$ divider 846 may be connected in series to operate as the second divider 844.

According to an embodiment, the output unit 850 acquires a result of performing the division on the input data from the selected operator. According to an embodiment, the output unit 850 may include a plurality of slots so that a result of a division performed in a parallel manner on each of a plurality of pieces of input data can be acquired.

Figure 9:
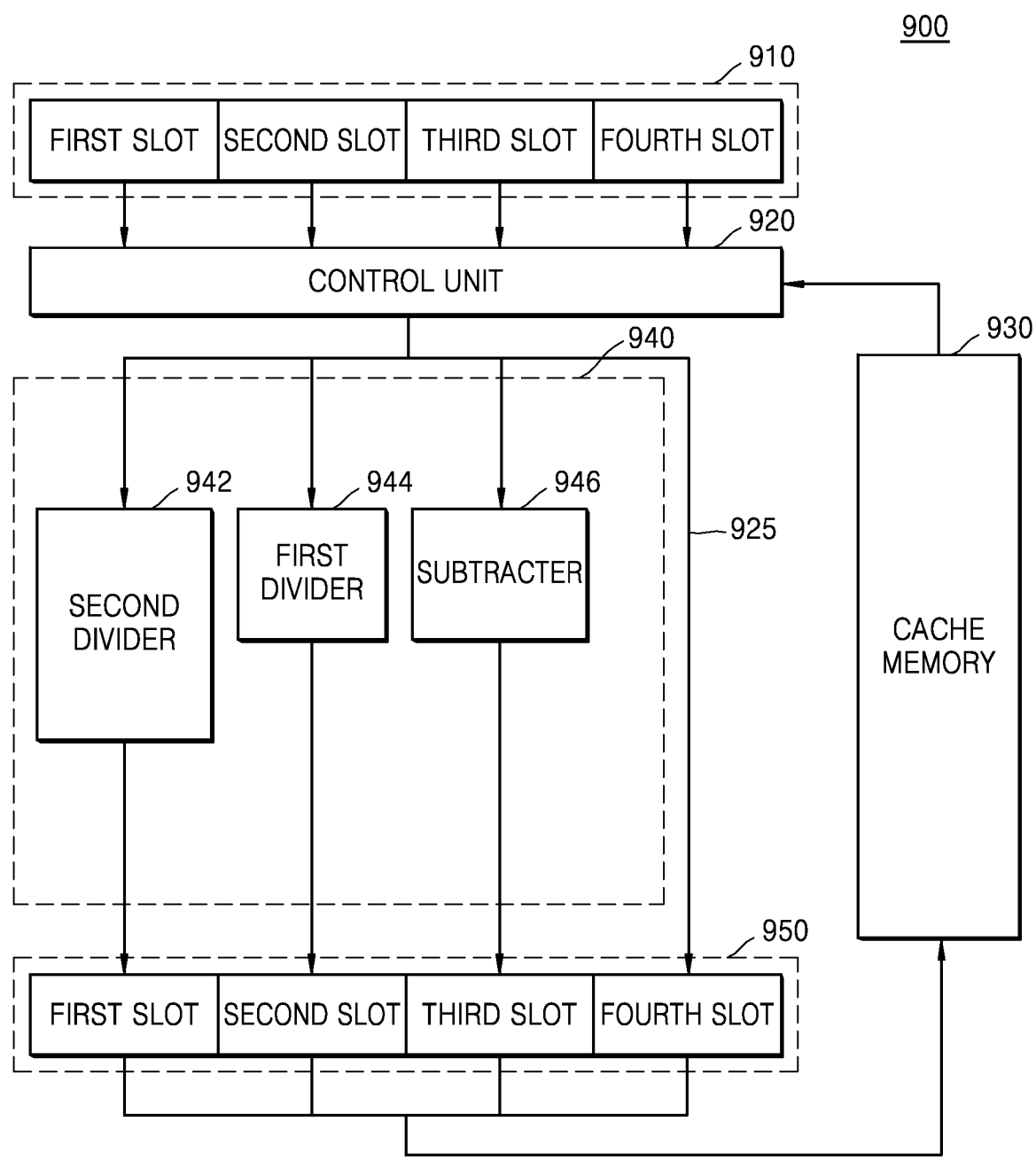
FIG. 9 is a block diagram for describing in more detail a division processing apparatus according to another embodiment.

FIG. 9 is a block diagram for describing in more detail a division processing apparatus 900 according to another embodiment.

The division processing apparatus 900 shown in FIG. 9 includes only components related to the present embodiment. Therefore, it should be understood by those of ordinary skill in the art that other general-use components besides the components shown in FIG. 9 may be further included.

Referring to FIG. 9, the division processing apparatus 900 may include an input unit 910, a control unit 920, a cache memory 930, a plurality of operators 940, and an output unit 950.

The input unit 910, the control unit 920, the cache memory 930, and the output unit 950, according to an embodiment, may correspond to the input unit 810, the control unit 820, the cache memory 830, and the output unit 850 described with reference to FIG. 8.

According to an embodiment, when a difference between input data and reference data is less than a preset value, the control unit 820 may determine a result of performing division on the reference data as a result of performing division on the input data, through a circuit 925 connected to the output unit 950. When the difference between the input data and the reference data is greater than or equal to the preset value, the control unit 920 may calculate a result of performing the division on the input data by using any one of the plurality of operators 940.

According to an embodiment, the plurality of operators 940 may include a second divider 942, a plurality of first dividers 944, and a subtracter 946.

In the division processing apparatus 900 in FIG. 9, the dividers 942 and 944 included in the plurality of operators 940 and the subtracter 946 may be connected to each other in a parallel manner.

However, this is only one example of configuring the plurality of operators 940, and a structure of the plurality of operators 940 is not limited thereto.

Figure 10:
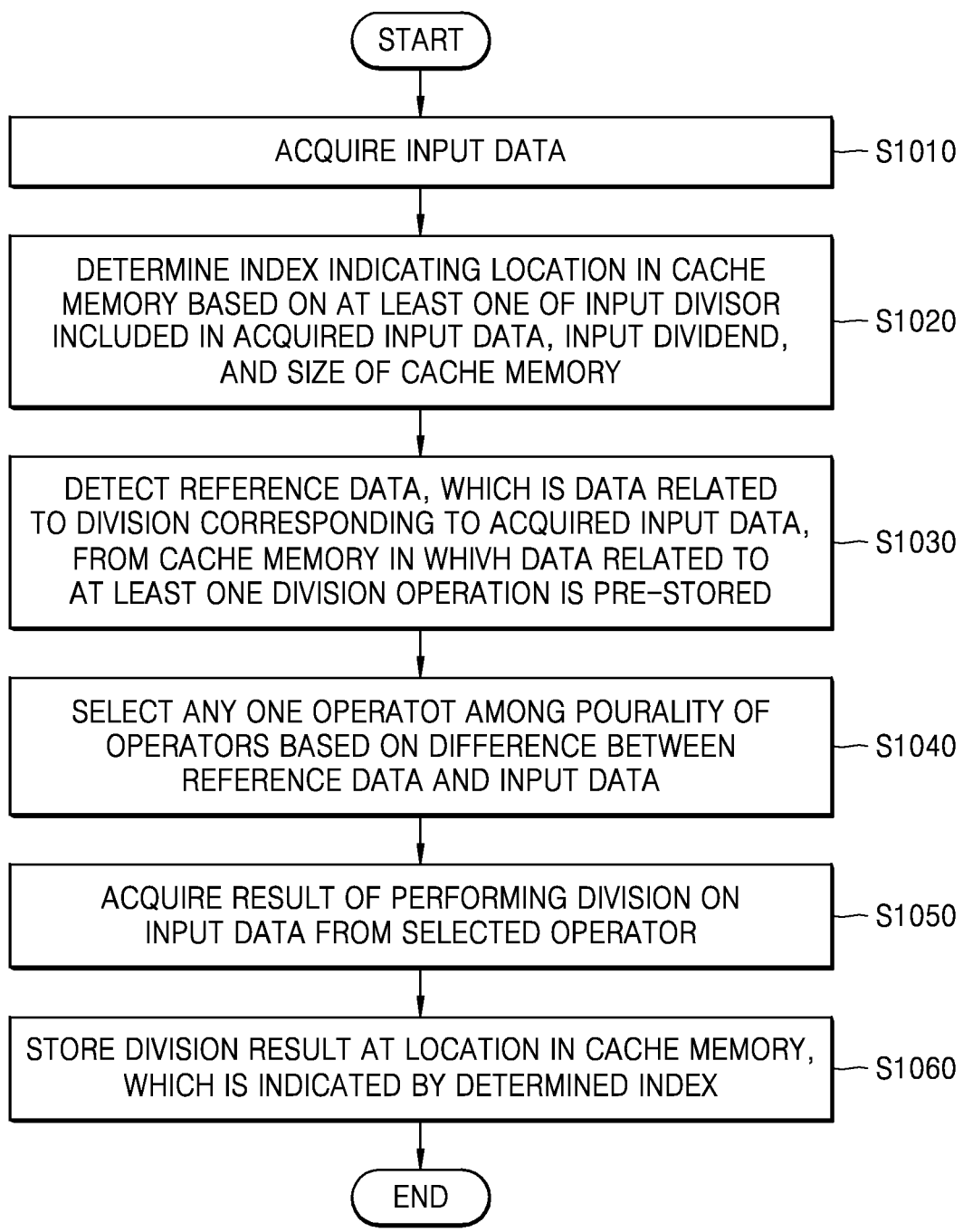
FIG. 10 is a flowchart for describing a method by which a division processing apparatus determines an index to detect reference data corresponding to input data, according to an embodiment.

FIG. 10 is a flowchart for describing a method by which the division processing apparatus 100 determines an index to detect reference data corresponding to input data, according to an embodiment.

In operation S1010, the division processing apparatus 100 may acquire input data.

Operation S1010 may correspond to operation S310 described above with reference to FIG. 3.

In operation S1020, the division processing apparatus 100 may determine an index indicating a location in the cache memory based on at least one of an input divisor included in the acquired input data, an input dividend, and a size of the cache memory.

For example, the control unit 120 may determine, as the index, a modulo operation result value between the input divisor and the size of the cache memory (130). As another example, the control unit 120 may determine index information by adding a division result between the input divisor and the size of the cache memory 130 to a modulo operation result between the input divisor and the size of the cache memory 130. As another example, the control unit 120 may determine the index information by adding partial data bits constituting the input dividend to the modulo operation result between the input divisor and the size of the cache memory 130.

In operation S1030, the division processing apparatus 100 may detect reference data related to a division operation corresponding to the acquired input data, from the cache memory in which data related to at least one division operation is pre-stored.

Operation S1030 may correspond to operation S320 described above with reference to FIG. 3.

In operation S1040, the division processing apparatus 100 may select any one operator from among a plurality of operators based on a difference between the detected reference data and the input data.

Operation S1040 may correspond to operation S330 described above with reference to FIG. 3.

In operation S1050, the division processing apparatus 100 may acquire a result of performing division on the input data from the selected operator.

Operation S1050 may correspond to operation S340 described above with reference to FIG. 3.

In operation S1060, the division processing apparatus 100 may store the division result at a location in the cache memory, which is indicated by the determined index.

FIG. 11 illustrates a method of determining an index when a difference between input divisors changed over time is a multiple of a size of a memory, according to an embodiment.

Referring to FIG. 11, an input divisor is changed from 32 to 64 and then 32 over time. In addition, 32 which is a difference between the changed input divisors may correspond to a multiple of 32 which is a size of a cache memory.

According to an embodiment, the division processing apparatus 100 may determine an index indicating a location in the cache memory based on at least one of an input divisor included in acquired input data, an input dividend, and a size of the cache memory. For example, the division processing apparatus 100 may determine, as the index, a division result value of the input divisor and the size of the cache memory.

However, as shown in FIG. 11, when the difference between the input divisors changed over time is a multiple of the size of the cache memory, if the index is determined as the division result value of the input divisor and the size of the cache memory, the same index value may be determined in a case where the input divisor is 32 and a case where the input divisor is 64. For example, when the input divisor is 64, the division processing apparatus 100 may detect 32, which is a reference divisor, by using an index determined based on the input divisor. In this case, a difference between 32 and 64 is relatively high, and thus it may be difficult to use a result of performing division on reference data when a division on 64 is performed.

Therefore, according to an embodiment, when a difference between input divisors changed over time is a multiple of the size of the cache memory, the division processing apparatus 100 may determine an index by adding a modulo operation result and a division result between an input divisor and the size of the cache memory. For example, when an input divisor is 32, and the size of the cache memory is 32, an index may be 1 obtained by adding 0 and 1. As another example, when an input divisor is 64, and the size of the cache memory is 32, an index may be 2 obtained by adding 0 and 2.

The division processing apparatus 100 may more efficiently perform processing of a division by setting different indices for different input divisors between which a difference is relatively high, to prevent division results of the input divisors from being stored at the same location in the cache memory.

FIG. 12 illustrates a method of determining an index when an input divisor is fixed, and an input dividend is changed over time, according to an embodiment.

Referring to FIG. 12, the input divisor is fixed to 0x5, and the input dividend is changed to 0x10020, 0x10, and 0x10020 over time.

According to an embodiment, the division processing apparatus 100 may determine an index indicating a location in a cache memory based on at least one of an input divisor included in acquired input data, an input dividend, and a size of the cache memory. For example, the division processing apparatus 100 may determine, as the index, a division result value of the input divisor and the size of the cache memory.

However, as shown in FIG. 12, when the input divisor is fixed, and the input dividend is changed, if the index is determined as the division result value of the input divisor and the size of the cache memory, the same index value may be determined for different input dividends.

Therefore, according to an embodiment, the division processing apparatus 100 may determine an index by adding a portion of bits constituting an input divisor to a low bit location of an index determined based on a division result of the input divisor and the size of the cache memory.

The division processing apparatus 100 may more efficiently perform processing of a division by setting different indices to prevent division results of different input divisions from being stored at the same location in the cache memory.

An apparatus according to the present disclosure may include a processor, a memory for storing and executing program data, a permanent storage such as a disk drive, a communication port for performing communication with an external device, and a user interface, such as a touch panel, a key, and a button. Methods implemented with a software module or an algorithm may be stored in a computer-readable recording medium in the form of computer-readable codes or program instructions executable in the processor. Examples of the computer-readable recording medium include magnetic storage media (e.g., read-only memory (ROM), random-access memory (RAM), floppy disks, hard disks, etc.) and optical recording media (e.g., CD-ROMs, Digital Versatile Discs (DVDs), etc.). The computer-readable recording medium can also be distributed over network coupled computer systems so that the computer-readable code is stored and executed in a distributed fashion. The media can be read by a computer, stored in the memory, and executed by the processor.

All cited references including publicized documents, patent applications, and patents cited in the present disclosure can be merged in the present disclosure in the same manner as the shown by individually and concretely merging each cited reference and the shown by generally merging each cited reference in the present disclosure.

For the understanding of the present disclosure, reference numerals are disclosed in the embodiments shown in the drawings, and specific terms are used to describe the embodiments of the present disclosure. However, the present disclosure is not limited by the specific terms, and the present disclosure may include all components, which can be commonly thought by those of ordinary skill in the art.

The present disclosure can be represented with functional blocks and various processing steps. These functional blocks can be implemented by various numbers of hardware and/or software configurations for executing specific functions. For example, the present disclosure may adopt direct circuit configurations, such as memory, processing, logic, and look-up table, for executing various functions under control of one or more processors or by other control devices. Like components of the present disclosure being able to execute the various functions with software programming or software elements, the present disclosure can be implemented by a programming or scripting language, such as C, C++, Java, or assembler, with various algorithms implemented by a combination of a data structure, processes, routines, and/or other programming components. Functional aspects can be implemented with algorithms executed in one or more processors. In addition, the present disclosure may adopt the prior art for electronic environment setup, signal processing and/or data processing. The terms, such as "mechanism", "element", "means", and "configuration", can be widely used and are not delimited as mechanical and physical configurations. The terms may include the meaning of a series of routines of software in association with a processor.

Specific executions described in the present disclosure are illustrative and do not limit the technical scope even in any method. For conciseness of the specification, disclosure of conventional electronic configurations, control systems, software, and other functional aspects of the systems may be omitted. In addition, connections or connection members of lines between components shown in the drawings illustrate functional connections and/or physical or circuit connections, and the connections or connection members can be represented by replaceable or additional various functional connections, physical connections, or circuit connections in an actual apparatus. In addition, if there is no concrete use of terms such as "requisite" or "important" to refer a component, that component may not be necessarily required for application of the present disclosure.

The invention claimed is:

1. A method of processing a division operation, the method comprising:
   acquiring input data;
   detecting reference data related to a division operation corresponding to the acquired input data, from a cache memory in which data related to at least one division operation is pre-stored;
   determining a difference value calculated between an input dividend included in the input data and a reference dividend included in the reference data, in response to an input divisor included in the input data corresponding to a reference divisor included in the reference data;
   selecting any one operator from among a plurality of operators identified according to at least one of a processable number of data bits and a calculation type, based on the difference value; and
   acquiring a result of performing the division operation from the selected operator as a quotient of the input data.

2. The method of claim 1, further comprising:
   determining whether the detected reference data is used, based on whether the input divisor included in the input data corresponds to the reference divisor included in the reference data.

3. The method of claim 2, wherein the determining the difference value comprises:
   calculating the difference value between the input dividend included in the input data and the reference dividend included in the reference data when the reference divisor is the same as the input divisor, and
   wherein the acquiring comprises:
   when the calculated difference value is less than or equal to a preset threshold and the input divisor, comparing the reference dividend and the input dividend; and
   as a result of the comparison, when the reference dividend is greater than the input dividend, determining, as the quotient of the input data, a value obtained by subtracting 1 from a quotient included in the reference data, and when the reference dividend is less than or equal to the input dividend, determining the quotient of the reference data as the quotient of the input data.

4. The method of claim 2, wherein the determining the difference value comprises:
   calculating the difference value between the input dividend included in the input data and the reference dividend included in the reference data when the reference divisor is the same as the input divisor, and
   wherein the acquiring comprises:
   when the calculated difference value is less than a preset threshold and is greater than the input divisor, calculating a quotient and a remainder obtained by dividing the difference value between the input dividend and the reference dividend by the input divisor; and
   when the calculated quotient is greater than or equal to 0, or the calculated remainder is 0, determining the quotient of the input data as a value obtained by adding the calculated quotient to a quotient of the reference data, and when the calculated quotient is less than 0, and the calculated remainder is not 0, determining the quotient of the input data as a value obtained by subtracting 1 from the value obtained by adding the calculated quotient to the quotient of the reference data.

5. The method of claim 2, wherein the acquiring comprises performing a division on the input dividend and the input divisor included in the input data when the reference divisor is different from the input divisor, or the difference value between the input dividend and the reference dividend is greater than a preset threshold.

6. The method of claim 1, wherein the plurality of operators comprises a first divider and a second divider of which processable numbers of data bits of a quotient of a division operation are different from each other, and
   wherein the selecting comprises selecting any one of the first divider and the second divider by comparing the processable number of data bits of the quotient of the division operation in the first divider and the input divisor included in the input data when the input divisor is different from the reference divisor included in the reference data.

7. The method of claim 1, further comprising:
   determining an index indicating a location in the cache memory, based on at least one of the input divisor included in the acquired input data, the input dividend included in the acquired input data, and a size of the cache memory,
   wherein the detecting comprises detecting the reference data from the cache memory by using the determined index.

8. A non-transitory computer-readable recording medium having recorded thereon a program for performing the method of claim 1.

9. An apparatus for processing a division operation, the apparatus comprises:
   a cache memory in which data related to at least one division operation is pre-stored;
   an input unit configured to acquire input data;
   a calculation unit including a plurality of operators identified according to at least one of a processable number of data bits and a calculation type;
   a control unit configured to detect reference data related to a division operation corresponding to the acquired input data, from the cache memory, determine a difference value calculated between an input dividend included in the input data and a reference dividend included in the reference data, in response to an input divisor included in the input data corresponding to a reference divisor included in the reference data and select any one of the plurality of operators based on the difference value; and
   an output unit configured to acquire a result of performing division operation from the selected operator as a quotient of the input data.

10. The apparatus of claim 9, wherein the control unit is further configured to determine whether the detected reference data is used, based on whether the input divisor included in the input data corresponds to the reference divisor included in the reference data.

11. The apparatus of claim 10, wherein the calculation unit is further configured to calculate the difference value between the input dividend included in the input data and the reference dividend included in the reference data when the reference divisor is the same as the input divisor, compare the reference dividend and the input dividend when the calculated difference value is less than or equal to a preset threshold and the input divisor, and as a result of the comparison, when the reference dividend is greater than the input dividend, determine, as the quotient of the input data, a value obtained by subtracting 1 from a quotient included in the reference data, and when the reference dividend is less than or equal to the input dividend, determine the quotient of the reference data as the quotient of the input data.

12. The apparatus of claim 10, wherein the calculation unit is further configured to calculate the difference value between the input dividend included in the input data and the reference dividend included in the reference data when the reference divisor is the same as the input divisor, calculate a quotient and a remainder obtained by dividing the difference value between the input dividend and the reference dividend by the input divisor when the calculated difference value is less than a preset threshold and is greater than the input divisor, determine the quotient of the input data as a value obtained by adding the calculated quotient to a quotient of the reference data when the calculated quotient is greater than or equal to 0, or the calculated remainder is 0, and determine the quotient of the input data as a value obtained by subtracting 1 from the value obtained by adding the calculated quotient to the quotient of the reference data when the calculated quotient is less than 0, and the calculated remainder is not 0.

13. The apparatus of claim 10, wherein the calculation unit is further configured to perform division on the input dividend and the input divisor included in the input data when the reference divisor is different from the input divisor, or the difference value between the input dividend and the reference dividend is greater than a preset threshold.

14. The apparatus of claim 9, wherein the plurality of operators comprises a first divider and a second divider of which processable numbers of data bits of a quotient of a division operation are different from each other, and wherein the control unit is further configured to select any one of the first divider and the second divider by comparing a threshold, which is the processable number of data bits of the quotient of the division operation in the first divider, and the input divisor included in the input data when the input divisor is different from the reference divisor included in the reference data.

15. The apparatus of claim 9, wherein the control unit is further configured to determine an index indicating a location in the cache memory, based on at least one of the input divisor included in the acquired input data, the input dividend included in the acquired input data, and a size of the cache memory, and detect the reference data from the cache memory by using the determined index.

* * * * *